though Patented Apr. 8, 1969

3,437,493
CROSS-LINKED CEREAL STARCH THICKENER FOR FOODSTUFFS
John W. Robinson, George N. Bookwalter, and John V. Tuschhoff, Macon County, Ill., assignors to A. E. Staley Manufacturing Company, Decatur, Ill., a corporation of Delaware
No Drawing. Filed Aug. 2, 1965, Ser. No. 476,742
Int. Cl. A23l 1/14; C09d 25/02
U.S. Cl. 99—139                                    3 Claims

ABSTRACT OF THE DISCLOSURE

A starch thickener composition for foodstuffs comprising a cross-linked cereal starch acylate and a phosphorus oxyhalide cross-linked hydroxypropyl cereal starch having a hydroxypropyl D.S. of at least 0.10 prepared by reacting a phosphorus oxyhalide with granular hydroxypropyl cereal starch.

---

This invention relates to a starch thickener composition comprising phosphorus oxyhalide cross-linked hydroxypropyl cereal starch and a cross linked cereal starch acylate.

Starches have been used for years as thickeners for a wide variety of foods. As technology in the food industry has become more and more sophisticated, the food industry has required tailor-made starch thickeners having a variety of specific properties. For example, there has developed in recent years a demand for fruit pie starch thickeners which are capable of being cooked with the other ingredients of a pie filling to form a paste, which, when hot, will have sufficient consistency or viscosity so that it will support the fruit properly, i.e. keep the fruit from rising to the top or settling to the bottom of the pie in machine depositing. The word "cooked" is used to mean heating above the pasting temperature of the starch. While the starch is pasted during this operation, the word "cooked" is not used synonymously with the word "pasted." On cooling, the starch paste must thicken to a consistently which is neither watery nor too stiff; the resulting cooled paste must be transparent, clear and brilliant and not cloudy; the paste must be short and not stringy; the starch must be freeze-thaw resistant, etc. Commonly assigned application Ser. No. 102,365, filed Apr. 12, 1961, now U.S. Patent 3,238,193 discloses a series of cross-linked cereal starch acylates having all the above properties to a high degree. However, even highly developed products such as those described in U.S. Patent 3,238,193, have been found deficient in some respects as the food industry has imposed even more stringent requirements on fruit pie starch thickeners.

At the time the cross-linked cereal starch acylates of U.S. Patent 3,238,193 were developed, it was the pie manufacturers' practice to mix together starch, sugar, fruit and water and batch cook these ingredients, relatively slowly, thereby permitting the starch thickeners to develop their full properties by pasting completely. Today, some frozen pie manufacturers desire to cook the starch, sugar and water almost instantaneously under pressure in a high-temperature continuous starch cooker at a temperature of about 180–240° F. and add fresh or frozen fruit to the resulting paste. Pies prepared from cross-linked cereal starch acylates of U.S. Patent 3,238,193, which have been prepared in a continuous cooker in the described manner, have been found to be inferior to those prepared by more gradual batch cooking methods, since the final pie filling is somewhat cloudy and has reduced freeze-thaw stability. The reason for this lack of clarity is not known. However, it is believed that the cloudiness is due to either the highly cross-linked nature of the cross-linked starch acylates which retards gelatinization or is due to possible hydrolysis of acylate groups during the rapid cooking. In any event, it has not been possible to overcome this lack of clarity without compromising at least one of the desirable and necessary properties of the cross-linked cereal starch acylates.

As pointed out in commonly assigned U.S. Patent 3,238,193, starches may be classified into two broad classes, one class comprising common cereal starches (corn, rice, wheat, for example) and the other class comprising root or root-type starches (potato, waxy maize, waxy sorghum, cassava, for example). For the purpose of this invention, "root-type" includes root and root-type starches. When root or root-type starches are cooked in water and then cooled, starch pastes are formed which are more viscous and more stable in viscosity than cereal starch pastes which have been prepared in the same way. When the root-type starch paste is cooled to room temperature, the starch paste retains its viscous character, clarity and texture to a far greater degree than a cereal starch paste which has been treated in the same manner. The cereal starch paste usually forms an opaque gel on cooling. The differences in the paste viscosity characteristics of root and root-type starches on the one hand and of cereal starches on the other hand is particularly pronounced when the starch is cooked at a pH less than 5 with the other ingredients of a food product, as in the preparation of fruit pies. The pH at which the starch is cooked is dependent on the acidity of the fruit and/or the tart acid flavorings, which are present during the cooking. The acid pH causes the paste viscosity of cereal starches to exhibit still greater instability. Accordingly, root and root-type starches are used in pie fillings, etc. in preference to cereal starches even though the root and root-type starches are frequently more expensive than the readily available cereal starches.

The object of this invention is to provide a cereal starch composition which can be utilized in the preparation of fruit pies where rapid continuous high temperature starch cookers are employed without the pie filling developing undesirable cloudiness and opacity. Other objects appear hereinafter.

We have now found that the object of our invention can be obtained by using a mixture of 10 to 50 parts by weight cross-linked cereal starch acylate described and claimed in commonly assigned U.S. Patent 3,238,193 and correspondingly 90 to 50 parts by weight of a phosphorus oxyhalide cross-linked hydroxypropyl cereal starch having a hydroxypropyl D.S. (degree of substitution) of at least 0.10. The complete disclosure of copending U.S. Patent 3,238,193 is hereby incorporated by reference into this specification.

As indicated in the preceding paragraph, the fruit pie thickeners of this invention comprise from about 50 to 90 parts by weight of a suitable phosphorus oxyhalide hydroxypropyl cross-linked cereal starch and correspondingly from about 50 to 10 parts by weight of a cross-linked cereal starch acylate. If the hydroxypropyl cross-linked cereal starch is used by itself (i.e. without cross-linked cereal starch acylate) the resulting pie filling upon cooling will form an undesirable gel. On the other hand, as pointed out above, the cross-linked cereal starch acylate, by itself, will form a cloudy pie filling. Accordingly, it is essential that the two cross-linked starches be employed together in order to provide applicants' results. In general, best results have been obtained using mixtures of from about 60 to 80 parts by weight phosphorus oxyhalide cross-linked hydroxypropyl cereal starches and correspondingly from 40 to 20 parts by weight of cross-linked cereal starch acylates.

For the purposes of our invention it is essential that the hydroxypropyl cross-linked cereal starch must (1) have a hydroxypropyl D.S. of at least 0.10, (2) be prepared by reacting phosphorus oxyhalide with granular hydroxypropyl cereal starch and (3) the extent of phosphorus oxyhalide cross-linking must be within very narrow limits as set forth below.

As indicated above, it is important that the pie starch thickeners of this invention be freeze-thaw resistant. A starch is generally considered to be freeze-thaw resistant when material amounts of water are not synerized from the starch paste during thawing. For example, food products, such as pies prepared with starches, which are not freeze-thaw resistant, become watery after defrosting and especially after baking. While uncross-linked hydroxypropyl cereal starches having a hydroxypropyl D.S. of at least 0.10 are not subject to syneresis, they exhibit another form of freeze-thaw instability. The hydroxypropyl starch pastes tend to gel and thicken markedly after undergoing one or two freeze-thaw cycles. This gelling and thickening is similar to the retrogradation of underivatized amylose and may be due to hydrogen bonding and/or orientation of starch molecules. This free-thaw instability is overcome by a controlled amount of cross-linking with a phosphorus oxyhalide.

Further, even if the cereal starch meets both of these criteria (hydroxypropyl D.S. of 0.10 and cross-linked with phosphorus oxyhalide), the starch will not be free-thaw resistant if the cross-linking step is performed before hydroxypropylation. The reason for this is not clear. However, the alkalinity necessary for hydroxypropylation may cause a partial hydrolysis of phosphate cross-links and/or ester interchange.

The hydroxypropyl groups of the cereal starch of this invention not only contribute to the freeze-thaw resistance of the underivatized cereal starch and excellent clarity of the starch paste, but also reduce the pasting temperature of the starch. The uncross-linked granular hydroxypropyl cereal starches paste readily on cooking and reach peak viscosity rapidly. On continued cooking the viscosity of the uncross-linked hydroxypropyl cereal starches drops precipitously. Accordingly, the uncross-linked hydroxypropyl cereal starches are unsuitable for most food uses since they are not sufficiently freeze-thaw resistant and have an unstable viscosity.

Cross-linking the hydroxypropyl cereal starches with phosphorus oxyhalide imparts freeze-thaw resistance as indicated above and gives the starch paste greater viscosity stability. The degree of cross-linking must be carefully controlled. If the hydroxypropyl cereal starch is reacted with too much phosphorus oxyhalide, the starch will be inhibited, i.e. incapable of pasting. Further, even if the starch is capable of pasting, its paste will not have the necessary clarity. On the other hand, if the hydroxypropyl cross-linked cereal starch is reacted with too little phosphorus oxyhalide, the final product will not have the necessary viscosity characteristics and/or freeze-thaw resistance. Accordingly, it is preferred to treat the hydroxypropyl cereal starches with an amount of phosphorus oxyhalide equivalent to about 0.005 to 0.05 parts by weight of phosphorus oxychloride per each 100 parts by weight hydroxypropyl cereal starch on a dry solids basis. As in U.S. Patent 3,238,193, it is not the amount of phophorus oxyhalide, which is added to the reaction vessel that controls the properties of the final product, but it is the amount of phosphorus oxyhalide which is reacted with the hydroxypropyl cereal starch.

While alkaline fluidity determinations are convenient for determining and controlling the extent of cross-linking in U.S. Patent 3,238,193, this method is not too useful for controlling the extent of cross-linking of hydroxypropyl cross-linked starch. As pointed out in U.S. Patent 3,238,193, the alkaline fluidity of a starch on reaction with a cross-linking agent decreases, passes through a minimum and then increases to a level well above the alkaline fluidity of the parent starch. Inasmuch as the hydroxypropyl cross-linked cereal starches have alkaline fluidities which are less than or approximately equal to the alkaline fluidity of the parent hydroxypropyl starch, it is extremely difficult to control the extent of cross-linking by this method. Further, it has been found that a single point on an alkalinity curve is not sufficiently precise to define the products of our invention. Further, since hydroxypropyl groups are not saponified off in the alkaline fluidity test, the alkaline fluidity of the base starch is dependent upon the extent of hydroxypropylation of the base starch. For example, the underivatized corn has an alkaline fluidity of about 36 cc. while a hydroxypropyl corn starch of D.S. 0.10 to 0.20 has an alkaline fluidity of about 18 cc.

It has been found that the degree of cross-linking is best controlled by a 40 minute CIV viscosity pH 6.5 buffered salt cook. The details of this test are described below. For use in our invention the granular hydroxypropyl cross-linked cereal starches must have a 10 minute pH 6.5 buffered salt CIV viscosity in the range of about 200 to 400 gram-centimeters and a 40 minute pH 6.5 buffered salt CIV viscosity of approximately 190 to 300 gram-centimeters. The best results have been obtained with granular hydroxypropyl cereal starches having a 10 minute CIV viscosity in the range of 260 to 370 gram-centimeters and a 40 minute CIV viscosity of about 200 to 300 gram-centimeters.

In a pH 6.5 buffered salt cook, uncross-linked granular hydroxypropyl cereal starch reaches a peak viscosity of over 400 gram-centimeters after cooking at about 200° F. for about 3 to 4 minutes. The viscosity then drops rapidly to about 150 gram-centimeters or less. The reaction of the first increments of phosphorus oxyhalide with a granular hydroxypropyl cereal starch increases the initial peak viscosity of the hydroxypropyl starch. As more phosphorus oxyhalide reacts with the granular hydroxypropyl starch, the peak viscosity of the hydroxypropyl starch is reduced and the 40 minute viscosity is increased, which means that the cross-linked hydroxypropyl cereal starch has a more stable viscosity than the parent uncross-linked starch.

As indicated above, the granular hydroxypropyl cross-linked cereal starch derivatives utilized in this invention are prepared by reacting phosphorus oxyhalide, such as phosphorus oxychloride or phosphorus oxybromide, with an aqueous alkaline suspension (pH 9–13) of granular hydroxypropyl cereal starch. The phosphorus oxyhalides are uniquely suitable for cross-linking the granular hydroxypropyl cereal starch since (1) they react rapidly and completely in a relatively short time (2) they can be added incrementally and (3) their cross-linkages are gradually saponified at the same pH as the cross-linking reaction is effected. Each of these properties contributes to making the in process CIV viscosity control feasible. Accordingly, phosphorus oxyhalide cross-linking is susceptible of the close control which is necessary in our invention.

For the purposes of our invention it is not too important how the granular hydroxypropyl cereal starch is produced as long as it has a minimum hydroxypropyl D.S. of at least 0.10, preferably above 0.11. It can be prepared by reacting propylene oxide with an alkaline (pH 9–13) polar (water, ethanol, dioxane) solvent suspension of granular cereal starch or by dry reaction techniques. In general, the most uniform substitution at the lowest cost is obtained by reacting an aqueous alkaline suspension of granular cereal starch with from about 7 to 30% by weight propylene oxide. When water is employed as the suspending medium for the hydroxypropylation reaction, a typical salt gelatinization inhibitor such as sodium sulfate, sodium chloride, etc. should be used. The alkaline pH is established with a basic material such as alkali metal hydroxides (sodium or potassium hydroxide), alkaline earth metal hydroxide (calcium or barium hydroxide), tetraalkylammonium hydroxides (tetraethylammonium hydroxide), sodium carbonate, sodium phosphate, etc.

The hydroxypropyl cross-linked cereal starch is then carefully washed after the reaction of phosphorus oxyhalide in order to remove all contaminants. The resulting granular product can then be pregelatinized on hot rolls or in an extruder and mixed with a similarly treated cross-linked cereal starch acylate. Or as is generally preferred, the two granular cereal starch products are blended together. The blended product may be pregelatinized or it may be shipped as it is to the ultimate user.

The cross-linked cereal starch acylates utilized in this invention are adequately described in commonly assigned U.S. Patent 3,238,193. As pointed out in said patent, these products are prepared by reacting a granular cereal starch with a polyfunctional cross-linking etherifying or esterifying reagent, such as epichlorohydrin, phosphorus oxychloride, acrolein, linear adipic anhydride, etc. and a monofunctional acylating agent such as a vinyl ester of a monocarboxylic acid containing from 1 to 18 carbon atoms or an anhydride of a monocarboxylic acid containing from 1 to 18 carbon atoms. These products have a 2 gram alkaline fluidity in the range of about 50 to 90 cc. preferably 55–85 cc. They are further characterized as having a 15 minute CIV viscosity at pH 3.5 of at least 700 gram-centimeters and a 40 minute CIV viscosity at pH 3.5 of at least 496 gram-centimeters (preferably in excess of 600 gram-centimeters). The preferred granular cross-linked cereal starch acylates are cross-linked with either epichlorohydrin, phosphorus oxychloride or acrolein and acylated with either vinyl acetate, vinyl propionate, acetic anhydride or propionic acid anhydride. These preferred cross-linked cereal starch acetates and propionates contain from about 1.5 to 3.5% by weight acylate groups.

The examples following are merely illustrative and should not be construed as limiting the scope of the invention.

The alkaline fluidity test referred to in the examples that follow is performed in the following manner. Two grams of starch is placed in a 400 ml. fluidity beaker. The starch is then suspended in approximately 100 ml. of an aqueous solution containing 0.95 gram of sodium hydroxide. The starch suspension is stirred at between 450 to 460 r.p.m. for 3 minutes in order to paste the starch. The resulting starch solution is poured into a standard fluidity funnel having a specific water-time between about 30 to 40 seconds. The number of cc. of starch solution which flows through the funnel in the water-time is the alkaline fluidity of the starch.

The pH 3.5 CIV cooking test used in the following examples is performed in the following manner. Sixty grams of starch is suspended in 1100 grams of a 35% (by weight) aqueous solution of sucrose and the pH of the suspension is lowered to 3.5 with citric acid. The suspension is then placed in a Corn Industries Research Foundation Viscometer with a heating jacket which is maintained at 201 to 203° F. The viscosity is recorded at its peak and 10, 15 and 40 minutes after the suspension has been placed in the viscometer.

The buffered pH 6.5 CIV viscosity is determined in the following manner. Fifty grams of starch (dry solids basis) is suspended in 940 grams of a pH 6.5 buffer solution. The buffered solution comprises a 1% by weight aqueous solution of disodium phosphate ($Na_2HPO_4$) and 0.2% by weight sodium benzoate which has been adjusted to pH 6.5 with citric acid (approximately 0.35 gram of citric acid is required by each 100 grams of solution). Ten grams of sodium chloride is added to 990 grams of starch slurry. The starch-buffered salt slurry is added to the CIV viscometer with a heating jacket which is maintained at about 201–203° F. The viscosity is recorded at its peak and at 10 and 40 minutes after the suspension has been placed in the viscometer.

EXAMPLE 1

A granular phosphorus oxychloride cross-linked hydroxypropyl cereal starch of this invention was prepared in the following manner. Three hundred parts by weight sodium sulfate was added to 1,000 parts by weight of granular corn starch (dry solids basis) suspended in 1150 parts by weight water. After the starch suspension was heated to about 110° F., 10 parts by weight sodium hydroxide (dry solids basis) was added as an aqueous 5% by weight solution to the suspension. Nitrogen gas was bubbled through the starch slurry in order to replace the air in the reaction vessel and the reaction vessel was sealed. Then 82.5 parts by weight propylene oxide was added to the starch slurry through a dip-tube while the reaction mixture was maintained at 108 to 112° F., continuously sparged with nitrogen, and stirred for 18 hours. Nitrogen sparging was discontinued; the reaction vessel was unsealed, and 0.09 part by weight phosphorus oxychloride was added to the granular hydroxypropyl starch slurry. After reacting for 1 hour, the pH 6.5 buffered salt CIV viscosity of a sample of the phosphorus oxychloride cross-linked hydroxypropyl cereal starch had a peak viscosity of 340 gram-centimeter, 292 gram-centimeters after 10 minutes, and 245 gram-centimeters after 40 minutes. The starch suspension was filtered, washed with water, reslurried with water, adjusted to pH 5, filtered again, washed carefully, and dried to between 9 to 11% moisture. The granular product had a two gram alkaline fluidity of about 7 cc. and 4.6% by weight hydroxypropyl groups (hydroxypropyl D.S. of 0.14).

EXAMPLE 2

Seven-hundred and forty grams of a dry blend of 555 grams of the granular phosphorus oxychloride cross-linked hydroxypropyl starch of Example 1 and 185 grams of a granular acrolein cross-linked corn starch acetate (prepared by the method of Example 1 of U.S. Patent 3,238,193 having an alkaline fluidity of 70 cc., 2.5% by dry weight acetyl and CIV viscosity at pH 3.5 after 15 minutes of 880 gram-centimeters and after 40 minutes of 744 gram-centimeters) was suspended in 3500 grams of water. Two thousand, three hundred and fifty grams of 43° Baumé Sweetose corn syrup, 1380 grams sucrose and 60 grams sodium chloride were added to the starch suspension. The resulting starch suspension was cooked in a continuous starch cooker of the type described in U.S. Patent 3,101,284 at 220° F. Seven hundred grams of cooked starch paste was cooled to 85° F., mixed with 750 grams of drained cherries and 500 grams of cherry juice, deposited into a pie shell and baked at 450° F. for 22 minutes. The pie was permitted to stand overnight at room temperature and the pie was cut. The cherry pie filling had excellent eye appeal (clarity) and mouth feel.

Essentially the same results were obtained using equal parts by weight of the two starch thickeners (370 grams of each) except that the clarity of the pie filling was slightly cloudy.

When this example was repeated using 470 grams of the granular phosphorus oxychloride cross-linked hydroxypropyl starch of Example 1 in place of the starch blend, the pie filling gelled and had an undesirable lumpy texture on eating.

When this example was repeated using 740 grams of the granular acrolein cross-linked corn starch acetate used in this example in place of the starch blend, the pie filling had poor clarity.

EXAMPLE 3

Example 2 was repeated with essentially the same results using a granular phosphorus oxychloride cross-linked hydroxypropyl corn starch having a hydroxypropyl D.S. of 0.11, a pH 6.5 buffered salt CIV viscosity of 265 gram-centimeters after 10 minutes, 220 gram-centimeters after 40 minutes and 320 gram-centimeters peak viscosity, which was prepared by the method of Example 1, in place of the granular phosphorus oxychloride crosslinked hydroxypropyl corn starch of Example 1.

EXAMPLE 4

Example 2 was repeated with essentially the same results using a granular phosphorus oxychloride crosslinked hydroxypropyl corn starch having a hydroxypropyl D.S. of 0.14, a pH 6.5 buffered salt CIV viscosity of 304 gram-centimeters after 10 minutes, 240 gram-centimeters after 40 minutes and 370 gram-centimeters peak viscosity, which was prepared by the method of Example 1, in place of the granular phosphorus oxychloride hydroxypropyl corn starch of Example 1.

EXAMPLE 5

Essentially the same results are obtained by replacing the acrolein cross-linked corn starch acetate used in Example 1 by a granular phosphorus oxychloride crosslinked corn starch acetate (prepared by the method of Example VIII of U.S. Patent 3,238,193 having an alkaline fluidity of 70.5 cc., 2.49% weight acetyl on an as-is basis and CIV viscosity at pH 3.5 after 15 minutes of 832 gram-centimeters and after 40 minutes of 728 gram-centimeters).

Since many embodiments of this invention may be made and since many changes may be made in the embodiments described, the foregoing is to be interpreted as illustrative only and our invention is defined by the claims appended hereafter.

We claim:

1. A starch thickener comprising from about 10 to 50 parts by weight of a cross-linked cereal starch acylate having an alkaline fluidity of about 50 to 90 cc. and about 90 to 50 parts by weight phosphorus oxyhalide crosslinked hydroxypropyl cereal starch having a hydroxypropyl D.S. of at least 0.10 and pH 6.5 buffered salt CIV viscosity of about 200 to 400 gram-centimeters after 10 minutes and 190 to 300 gram-centimeters after 40 minutes prepared by reacting a phosphorus oxyhalide with granular hydroxypropyl cereal starch.

2. A starch thickener comprising from about 10 to 50 parts by weight of a cross-linked cereal starch acylate having an alkaline fluidity of about 50 to 90 cc. and about 90 to 50 parts by weight phosphorus oxyhalide crosslinked hydroxypropyl corn starch having a hydroxypropyl D.S. of at least 0.10 and pH 6.5 buffered salt CIV viscosity of about 260 to 370 gram-centimeters after 10 minutes and 200–300 gram-centimeters after 40 minutes prepared by reacting a phosphorus oxyhalide with granular hydroxypropyl cereal starch.

3. The composition of claim 2, wherein said crosslinked cereal starch acylate comprises a cross-linked cereal starch acetate.

References Cited

UNITED STATES PATENTS 2,977,356   3/1961   Commerford et al. _ 99—139 XR
3,238,193   3/1966   Tuschhoff et al. ___ 99—139 XR RAYMOND N. JONES, *Primary Examiner.*

U.S. Cl. X.R.

99—92; 106—210; 260—233.3